United States Patent [19]

Tutor et al.

[11] 4,107,338

[45] Aug. 15, 1978

[54] BATTER MIX CONTAINING FLOURY STARCH OF FL$_2$FL$_2$ CONSTITUTION

[75] Inventors: Gerald L. Tutor, Sappington, Mo.; James C. Fruin, Green Valley, Ariz.; James L. Helm, Laurinburg, N.C.

[73] Assignee: Anheuser-Busch, Incorporated, St. Louis, Mo.

[21] Appl. No.: 739,209

[22] Filed: Nov. 5, 1976

[51] Int. Cl.$^2$ ............... A23L 1/176; A21D 10/00
[52] U.S. Cl. ................................. 426/293; 426/305; 426/549; 426/555; 426/295; 426/296
[58] Field of Search ............... 426/549, 289, 290, 291, 426/293, 295, 296, 618, 553, 94; 536/102, 105; 127/32

[56] References Cited

U.S. PATENT DOCUMENTS

| | | | |
|---|---|---|---|
| 3,208,851 | 9/1965 | Antinori et al. | 426/293 |
| 3,482,984 | 12/1969 | Marotta et al. | 426/293 |
| 3,723,137 | 3/1973 | Fischer et al. | 426/293 |
| 3,767,826 | 10/1973 | Fruin | 426/293 |

*Primary Examiner*—Jeanette M. Hunter
*Attorney, Agent, or Firm*—Gravely, Lieder & Woodruff

[57] ABSTRACT

A batter mix for covering food products, so that bread crumbs will adhere to the food product to form a coating, said mix comprising starch, derived from corn or other grains having the genetic composition $fl_1fl_1$, and water. The starch in the batter mix may also have been treated with mild oxidizing agents.

20 Claims, No Drawings

BATTER MIX CONTAINING FLOURY STARCH OF FL$_2$FL$_2$ CONSTITUTION

BACKGROUND OF THE INVENTION

Adherence of the coating is a problem in the preparation of frozen and nonfrozen food products, particularly fish fillets. Batter starches have been used for covering the fish to cause bread crumbs to stick to the fish. It is well-known that these products do not do a completely satisfactory job because the coatings tend to fall off or pull away from the food product.

Recently U.S. Pat. No. 3,482,984 proposed a partial solution to this problem by teaching the method of using an aqueous solution of sodium hypochlorite to oxidize a starch product used in making batter mix. This process has the disadvantage of requiring special equipment to handle dry sodium hypochlorite, which is unstable and is a hazard in a plant.

Starch derived from dent corn, by itself, provides some adhesion of the breading material to the food piece. Fruin U.S. Pat. No. 3,767,826 discloses a batter mix made from a starch product which had been dry mixed with an oxidizing agent. Murray et al U.S. Pat. No. 3,597,227 discloses a method of improvement of deep fried potato slices by coating the surface of raw potato with amylose derived from the fractionation of whole starch prior to cooking in oil. Ducharme et al U.S. Pat. No. 3,052,545 discloses a batter mix composition comprising a starch having a sediment volume ranging from 40 to 50, and a granule swelling power ranging from 10 to 20 resulting from a mild cross-linking process.

Several modified cereal flours and combinations of modified cereal flours have been used by the frozen food industry for several years as a batter. However, none of the products is completely satisfactory.

An ideal batter is one that will adhere breading to the food piece under a wide range of conditions. Starch heretofore, by itself, has not had sufficient adhesive power to constitute an ideal batter.

We have discovered that starch from corn of the genetic composition $fl_1 fl_1$, by itself, can be used to produce a batter mix having excellent adhesive properties. Oxidation of the starch, aging under controlled conditions, and other types of treatment known in the art, further improve the adhesive properties of the $fl_1 fl_1$ starch.

The use of $fl_1 fl_1$ is important because it permits the use of cornstarch as batter starch without the need for oxidizing agents. However, the use of the proper amount of an oxidizing agent enhances the adhesive effect of the floury starch.

SUMMARY OF THE INVENTION

This invention involves batter mix for coating food products so that bread crumbs will adhere to the food product. The mix includes starch having the genetic composition $fl_1 fl_1$, preferably derived from corn, and water.

The aforementioned starch may have been treated with about 0.01 to about 0.20% by weight oxidizing agent, preferably calcium hypochlorite. The invention further involves the starch product and process hereinafter described and claimed.

DETAILED DESCRIPTION

This invention concerns the processing of a starch product having a specific genetic constitution to produce a base for a batter mix.

Cornstarch is the preferred starch although other starches, such as cereal and root starches, can be used. The starch is derived from corn or other grains of the genetic constitution $fl_1 fl_1$. This starch, unmodified, provides excellent adhesive properties in batter breading mixes.

The starch useful in this invention has the genetic constitutions $fl_1 fl_1$. The gene for floury-1 ($fl_1$) is located at position 68 of Chromosome 2. The invention also is applicable where the $fl_1$ gene has been moved to another part of the plant genome by translocation, inversion, or other known methods of chromosome engineering. While the invention has been described herein with specific reference to cornstarch, it is equally applicable to plant species other than corn in which the floury gene follows the historic genetic floury-flinty type segregation unique to this floury gene. Typical of such plants are sorghum, barley, rice, etc. This invention further is applicable to artificial mutants and variants of the foregoing which may be produced by known standard methods of mutation breeding.

The floury endosperm is opaque and soft, and stains blue with iodine. This property distinguishes it from waxy starch which stains red. See Neuffer, Jones, Zuber, *The Mutants of Maize* 1968, p. 16. As mentioned previously, the gene which produces the particular phenotype characteristics of $fl_1$ is found on the 68 position of Chromosome 2 of the maize plant (*The Mutants of Maize*, p. 16).

When the $fl_1 fl_1$ starch is used to make a batter, from about 100 gm to about 200 gm of floury 1 starch are mixed with about 100 gm to about 300 gm of water to form a slurry. Satisfactory results are also obtained by mixing in the slurry from about 100 gm to about 200 gm of floury 1 starch and from about 50 gm to about 400 gm of corn flour with about 150 gm to about 750 gm of water.

A preferred oxidizing agent is calcium hypochlorite. Other oxidizing agents, such as sodium hypochlorite, sodium chlorite, and potassium bromate may also be used.

EXAMPLE I

To make the batter, 200 grams of floury starch are mixed in a slurry with 225 grams of water. The fish/meat can be covered with this mixture and then breaded.

EXAMPLE II

To make the batter, 100 grams of floury starch and 100 grams of corn flour are mixed in a slurry with 267 grams of water. The fish/meat can be covered with this mixture and then breaded.

EXAMPLE III

In this example, about 0.02 gm to about 0.4 gm of NaClO$_2$ is mixed with 200 gms of dry floury starch. The thus modified starch is then mixed with 225 gms of water.

The food portions, frozen or unfrozen, but preferably frozen cod portions weighing about 3-4 ounces each, are covered with the starch batter made from floury-1 starch and then coated with bread crumbs. The crumb coated portions are either refrozen or deep-fat fried at 375° F ± 5° F for 3-5 minutes.

The fried cod portions are then placed on edge and slit with a knife, exposing the interior surfaces in a manner similar to opening a book. Flesh is scraped from the batterbreading coating and the amount of fish flesh adhering to the coating is estimated. The tables show the number of fish per hundred coated that fell into each of the percent adhesion ranges. In preparing the tables, each side of the cod portion is examined and the percent of coating adhesion is estimated by a worker skilled in this art.

The tables show examples of results obtained by dipping pieces of frozen fish in batter and then coating with breading and finally deep-fat frying. The tables show the degree of breading adhesion to frozen cod portions in ranges of 95 to 100%, 90 to 95%, 80 to 90%, and less than 80%.

Table I shows the enhancement effect obtained by using $fl_1 fl_1$ unmodified dent cornstarch in the batter mix as compared with regular unmodified dent cornstarch. This table also shows the effect of light $Ca(OCl)_2$ oxidation of the dry starch prior to use in breading.

TABLE 1

| Source of Starch | Treatment of Starch | Age of Starch When Tested (days) | Test Temperature | Adhesion (Per Cent) | | | |
|---|---|---|---|---|---|---|---|
| | | | | 95/100 | 90/95 | 80/90 | 0/80 |
| Dent Corn | Unmodified | 1 | Ambient | 0 | 0 | 17 | 83 |
| $fl_1 fl_1$ | Unmodified | 1 | Ambient | 0 | 0 | 50 | 50 |
| Dent Corn | 0.10% $Ca(OCl)_2$ | 1 | Ambient | 8 | 34 | 50 | 8 |
| $fl_1 fl_1$ | 0.10% $Ca(OCl)_2$ | 1 | Ambient | 8 | 50 | 34 | 8 |

Table 2 shows the effect of varying the concentration of $Ca(OCl)_2$ on the $fl_1 fl_1$ cornstarch batter mix.

TABLE 2

| Source of Starch | Treatment of Starch | Age of Starch When Tested (days) | Test Temperature | Adhesion (Per Cent) | | | |
|---|---|---|---|---|---|---|---|
| | | | | 95/100 | 90/95 | 80/90 | 0/80 |
| Dent Corn | Unmodified | 3 | Ambient | 0 | 0 | 17 | 83 |
| $fl_1 fl_1$ | Unmodified | 3 | Ambient | 0 | 17 | 25 | 58 |
| $fl_1 fl_1$ | 0.05% $Ca(OCl)_2$ | 3 | Ambient | 14 | 29 | 43 | 14 |
| $fl_1 fl_1$ | 0.10% $Ca(OCl)_2$ | 3 | Ambient | 33 | 33 | 17 | 17 |

Table 3 shows the effect of aging on dent cornstarch, modified and unmodified, and $fl_1 fl_1$ cornstarch, modified and unmodified. When the results shown in Table 3 are compared with the results shown in Table 1, it can be seen that aging enhances the adhesive properties of the batter mix.

TABLE 3

| Source of Starch | Treatment of Starch | Age of Starch When Tested (days) | Test Temperature | Adhesion (Per Cent) | | | |
|---|---|---|---|---|---|---|---|
| | | | | 95/100 | 90/95 | 80/90 | 0/80 |
| Dent Corn | Unmodified | 60 | Ambient | 0 | 16 | 42 | 42 |
| $fl_1 fl_1$ | Unmodified | 60 | Ambient | 0 | 25 | 42 | 25 |
| Dent Corn | 0.10% $Ca(OCl)_2$ | 60 | Ambient | 8 | 25 | 50 | 17 |
| $fl_1 fl_1$ | 0.10% $Ca(OCl)_2$ | 60 | Ambient | 25 | 33 | 42 | 0 |

Table 4 shows the effect that mild oxidation of $fl_1 fl_1$ cornstarch has on adhesive properties of a batter mix which is composed of $fl_1 fl_1$ cornstarch and corn flour.

TABLE 4

| Source of Starch | Treatment of Starch | Age of Starch When Tested (Days) | Test Temperature | Adhesion (Per Cent) | | | |
|---|---|---|---|---|---|---|---|
| | | | | 95/100 | 90/95 | 80/90 | 0/80 |
| $fl_1$ | Unmodified | 7 | Ambient | 34 | 50 | 16 | 0 |
| $fl_1$ | 0.05% $NaClO_2$ | 7 | Ambient | 50 | 34 | 16 | 0 |

Table 5 shows the effect that mild oxidation of $fl_1 fl_1$ cornstarch has on adhesive properties of a batter mix which is composed of $fl_1 fl_1$ cornstarch, corn flour, and salt.

TABLE 5

| Source of Starch | Treatment of Starch | Age of Starch When Tested (days) | Test Temperature | Adhesion (Per Cent) | | | |
|---|---|---|---|---|---|---|---|
| | | | | 95/100 | 90/95 | 80/90 | 0/80 |
| $fl_1 fl_1$ | Unmodified | 7 | Ambient | 8 | 8 | 25 | 59 |
| $fl_1 fl_1$ | 0.05% $NaClO_2$ | 7 | Ambient | 34 | 50 | 16 | 0 |

In the tables where regular dent cornstarch receives the same treatment as floury dent cornstarch, the floury starch exhibits a higher degree of adhesion than does the dent cornstarch (Tables 1, 2, and 3). In the tables where floury cornstarch receives treatment with an oxidizing agent, it is apparent that the oxidized starch exhibits a higher degree of adhesion than does the nonoxidized starch (Tables 1, 2, 3, 4, and 5).

What is claimed is:

1. Batter mix comprising floury starch derived from a plant of the genetic constitution $fl_1 fl_1$, and translocations, inversions, mutants, and variants thereof, and water.

2. The starch of claim 1 wherein the plant is corn.

3. The mix of claim 1 which has been treated with an oxidizing agent.

4. The mix of claim 3 wherein the oxidizing agent is calcium hypochlorite.

5. The batter mix of claim 1 wherein corn flour is added to the starch and water.

6. The batter mix of claim 1 wherein the dry starch is modified by the addition of a dry oxidizing agent before mixing with water.

7. The batter mix of claim 6 wherein an oxidizing agent is added to dry starch, and then the modified starch is mixed with corn flour and water.

8. The batter mix of claim 1 wherein about 10% to about 80% by weight starch is used and about 30% to about 80% by weight water is used.

9. The batter mix of claim 5 wherein about 10% to about 80% by weight starch is used, about 30% to about 80% by weight water is used, and about 10% to about 80% by weight corn flour is used.

10. The batter mix of claim 6 wherein about 10% to about 80% by weight starch is used, about 30% to about 80% by weight water is used, and about 0.01% to about 0.2% by weight oxidizing agent is used.

11. The batter mix of claim 7 wherein about 10% to about 80% by weight starch is used, about 10% to about 80% by weight corn flour is used, about 30% to about 80% water is used, and about 0.01% to about 0.2% oxidizing agent is used.

12. The batter mix of claim 6 wherein the oxidizing agent is $Ca(OCl)_2$.

13. The batter mix of claim 6 wherein the oxidizing agent is $Na(ClO_2)$.

14. A process of preparing a coated food product including the steps of:
    (a) mixing starch derived from a plant of the genetic constitution $fl_1 fl_1$, and translocations, inversions, mutants, and variants thereof, with water,
    (b) forming a batter from said treated starch,
    (c) applying said batter to a food product, and
    (d) coating said food product with a final coating of edible particulate material.

15. The process of claim 14 wherein an oxidizing agent is added to the starch.

16. The process of claim 15 wherein the oxidizing agent is $Ca(OCl)_2$.

17. The process of claim 14 including mixing cornflour with the starch and water and wherein the starch is cornstarch.

18. The process of claim 18 wherein an oxidizing agent is added to the starch.

19. The process of claim 18 wherein the oxidizing agent is $Ca(OCl)_2$.

20. The process of claim 18 wherein the oxidizing agent is $NaClO_2$.

* * * * *